United States Patent
Ruffa

(10) Patent No.: US 6,879,543 B1
(45) Date of Patent: Apr. 12, 2005

(54) ACOUSTIC PROCESSING FOR ESTIMATING SIZE OF SMALL TARGETS

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 14 days.

(21) Appl. No.: 10/637,074

(22) Filed: Aug. 7, 2003

(51) Int. Cl.[7] .............................................. G01S 15/02
(52) U.S. Cl. ........................................................ 367/131
(58) Field of Search ................................. 367/7, 11, 99, 367/131; 600/443; 73/606

(56) References Cited

U.S. PATENT DOCUMENTS 3,918,297 A * 11/1975 Rocha ............................ 367/7
5,231,609 A * 7/1993 Gaer ............................. 367/99

* cited by examiner

Primary Examiner—Daniel Pihulic
(74) Attorney, Agent, or Firm—James M. Kasischke; Michael F. Oglo; Jean-Paul A. Nasser

(57) ABSTRACT

A method is provided for estimating the size of an object from a region of a fluid medium when that object is emitting acoustic radiation of known wavelength λ on its own or as the result of being interrogated by acoustic pulses that reflect from the object. The acoustic radiation is monitored using a line array of N acoustic receivers such that N signals indicative of the acoustic radiation are generated. M time series summations are formed using the N signals. Each of the M time series summations is formed using a unique time delay predicated on a corresponding unique estimated speed of propagation of the acoustic radiation where M estimated speeds of propagation are defined. For an object in the region having a diameter D on the order of λ, the M values will vary as a function of the M estimated speeds of propagation with the resulting distribution of the M values being indicative of diameter D.

11 Claims, 3 Drawing Sheets

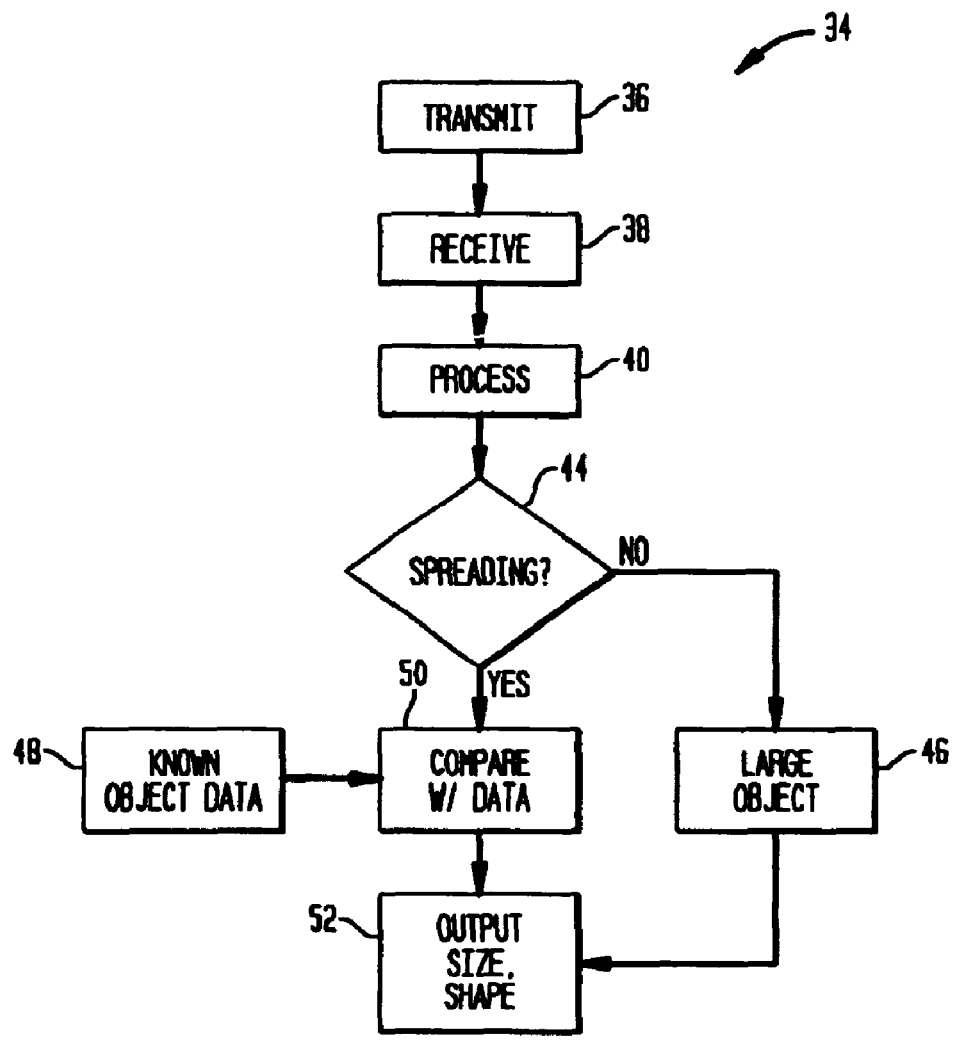

ACOUSTIC PROCESSING FOR ESTIMATING SIZE OF SMALL TARGETS

CROSS REFERENCE TO OTHER PATENT APPLICATIONS

Not applicable.

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to acoustic processing, and more particularly to an acoustic processing method that can be used to estimate the size of small objects in a fluid medium.

(2) Description of the Prior Art

It is difficult to generate an image of an object using acoustic echoes when the object size is on the order of the wavelength of the acoustic radiation used to generate the echoes. At lower frequencies, or smaller sizes, scattering becomes less "specular" and more "diffracting" in nature. While there have been some successful efforts involving the imaging of small objects in the near field, the technique cannot be extended to the imaging of small objects in the far field. If such far field imaging could be achieved, it could be used in medical acoustic, sonar, and particle detection on semiconductor wafer evaluation applications. In each of these applications, it may also be desirable to know the size of the small object, e.g., a tumor or other physical abnormality in medical acoustic applications, a mine-like object in sonar applications, and an imperfection in a semiconductor in wafer evaluation applications.

SUMMARY OF THE INVENTION

Accordingly, it is an object of the present invention to provide a method of acoustic processing that can be used to estimate the size of a small object.

Another object of the present invention is to provide a method of acoustic processing that can be used to estimate the size of an object that is smaller that one to two wavelengths of the acoustic radiation directed towards the object for the purpose of generating reflections or echoes therefrom.

Still another object of the present invention is to provide a method that uses only a single orientation of a sensor array to estimate the size of a small object.

Other objects and advantages of the present invention will become more obvious hereinafter in the specification and drawings.

In accordance with the present invention, a method for estimating the size of an object begins with monitoring acoustic radiation originating from a region of a fluid medium using a line array of N acoustic receivers such that N signals indicative of the acoustic radiation are generated. It is assumed that the acoustic radiation has a known wavelength $\lambda$. M time series summations are formed using the N signals. Each of the M time series summations is formed using a unique time delay predicated on a corresponding unique estimated speed of propagation of the acoustic radiation where M estimated speeds of propagation are defined. A temporal Fourier transform is performed on each of the M time series summations to generate M values. For an object in the region having a diameter $D<2\lambda$, the M values will vary as a function of the M estimated speeds of propagation. The resulting distribution of the M values are indicative of diameter D.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 3 is a flowchart of the method of the present invention;

DESCRIPTION OF THE PREFERRED EMBODIMENT(S)

Figure 1:
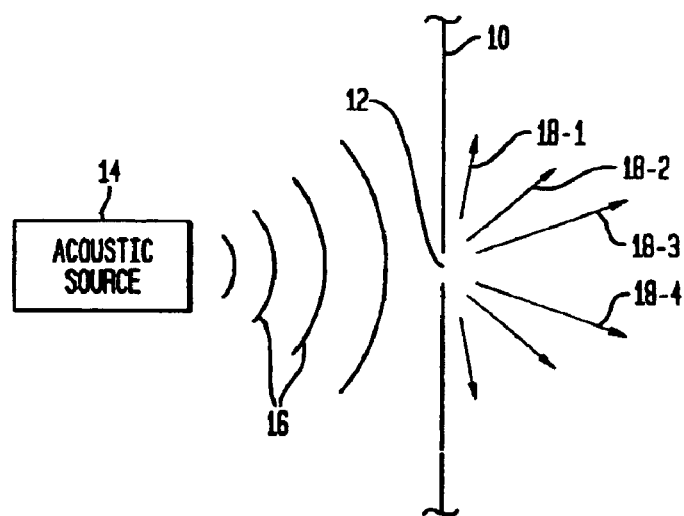
FIG. 1 is a diagrammatic view of an acoustically opaque screen having a two dimensional aperture formed therethrough where the screen is subjected to a planar acoustic wave on one side thereof to illustrate the propagation of the acoustic radiation passing through the aperture on the other side of the screen.

Before describing the method of the present invention, it will be beneficial to describe some background concepts on which the present invention is predicated. Referring now to the drawings, and more particularly to FIG. 1, an infinite, acoustically opaque screen is referenced by numeral 10. Screen 10 has an aperture 12 formed therethrough. On one side of screen 10, an acoustic source 14 propagates a planar acoustic wave 16 towards screen 10. If the diameter of aperture 12 is small (e.g., on the order of the wavelength of acoustic wave 10), acoustic wave 16 diverges as it passes through aperture 12 to form diverging waves 18-1, 18-2, . . . traveling at a range of velocities. The slowest velocities are found in the diverging waves moving approximately parallel to screen 10 (e.g., wave 18-1) and the fastest velocities are found in the diverging waves moving approximately perpendicular to screen 10 (e.g., wave 18-4).

The method of the present invention takes note of the fact that an exact solution for (acoustic wave) diffraction of a two-dimensional aperture in an infinite screen is given as $$p(x, y, z, t) = \frac{e^{-i\omega_0 t}}{4\pi^2} \int_{-\infty}^{\infty}\int_{-\infty}^{\infty} F(k_x, k_y) e^{-ixk_x} e^{-iyk_y} e^{iz\sqrt{k^2-k_x^2-k_y^2}} \, dk_x dk_y \quad (1)$$

See G. C. Gaunaurd et al., J. Acoust. Soc. Am., Vol. 63, p. 5, 1978. In equation (1), p is the acoustic pressure, $F(k_x,k_y)$ is the two-dimensional spatial Fourier transform in the screen that is in the X-Y plane, and k is the propagation wavenumber in the z direction. This equation solves the governing equation exactly and meets all boundary conditions.

The above diffraction integral can be evaluated using the generalized method of exhaustion to more clearly see the behavior of each component using the following $$\int_0^b f(x)dx = b \sum_{n=1}^{\infty} \sum_{m=1}^{2^n-1} (-1)^{m+1} 2^{-n} f(mb/2^n) \quad (2)$$

This method of exhaustion is disclosed by A. A. Ruffa, International Journal of Mathematics and Mathematical Sciences 31(6), 8 Aug. 2002, p. 345. Note that propagating waves will only occur when the transverse wavenumber $(k_x^2+k_y^2)^{1/2}$ is lower than the cutoff wavenumber, so the integral can be evaluated to ok with good accuracy (assuming that $F(k_x,k_y)$ is an even function with respect to both $k_x$ and $k_y$) as follows $$p(x, y, s, t) \equiv \frac{2k^2}{x} e^{-i\omega_0 t} \sum_{n=1}^{\infty} \sum_{m=1}^{2^n-1} \sum_{p=1}^{\infty} \sum_{q=1}^{2^p-1} (-1)^{m+q2-n-p} F\left(\frac{mk}{2^n}, \frac{qr}{2^p}\right) e^{-imxk2^n} e^{-iqyk2^p} e^{izk\sqrt{k^2-m^2/4^n-q^2/4^p}} \quad (3)$$

From this expression, it can be shown that the resulting field is due to a summation of an infinite number of contributions (e.g., waves 18-1, 18-2, . . . ), each propagating at a different phase speed (and hence a different group speed) based on its value of $k_x$ and $k_y$.

The acoustic field radiating from such an aperture will have a continuous range of velocities, the amplitude distribution of which will depend on the Fourier transform of the field at the aperture $F(k_x,k_y)$. For example, if the field scattered from acoustic source 14 is replaced by plane wave of infinite extent, $F(k_x,k_y)$ becomes a Dirac delta function and the velocity distribution reduces to that of a single velocity. If, on the other hand, the aperture is very small compared toga wavelength, then $F(k_x,k_y)$ will be nearly constant up to the cutoff wavenumber and the propagation velocity distribution will be much larger.

In equation (3), the aperture will radiate propagating waves 18-1, 18-2, . . . as long as $k^2 \geq k_x^2+k_y^2$ (the cutoff wavenumber). For spanwise wavenumbers $k_x$ and $k_y$ that do not meet this condition, the resulting field will not propagate, but rather will be a decaying evanescent field.

The phase speed will increase from c at the zero spanwise wavenumber to infinity at the cutoff wavenumber. The group speed, however, will decrease from c to zero at the cutoff wavenumber. The group speed is independent of range and is given as $$c_g = c\sqrt{1-(k_x^2+k_y^2)/k^2} \quad (4)$$

Large decreases in group speed will lead to increased Doppler shifts. This can be potentially useful for low-Doppler targets. Also, if the velocity distribution of the acoustic field (associated with waves 18-1, 18-2, . . . ) can be measured, it will be directly related to $F(k_x,k_y)$, and therefore provide information on the effective size of aperture 12.

Figure 2:
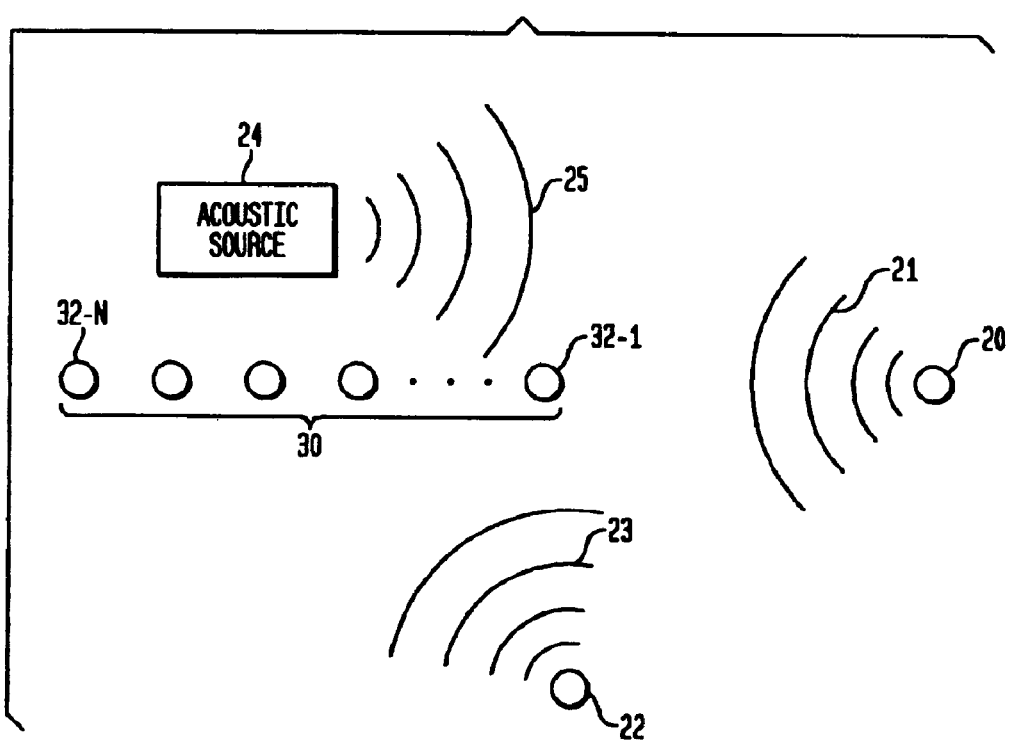
FIG. 2 is a schematic view of a line array of acoustic receivers used to detect acoustic radiation originating from targets located in both the end fire beam of the array and in beams away from end fire.

The present invention provides a method for estimating the size of a small object in a fluid medium using the principles described above. To explain the present method, reference will be made to FIG. 2 where two small objects 20 and 22 are assumed to reside in a fluid (e.g., water) medium.

A linear (or line) array 30 of acoustic receivers are placed in the fluid medium. As illustrated, object 20 lies in the end fire region of array 30 and object 22 lies in region away from the end fire of array 30.

The number of receivers used is not a limitation of the present invention. In general, N acoustic receivers will be discussed herein. Each of receivers 32-1 to 32-N is capable of passively detecting acoustic radiation (waves) 21 and 23 originating from each of objects 20 and 22, respectively. Typically, acoustic radiation 21 and 23 is representative of acoustic reflections caused when an acoustic source 24 transmits acoustic radiation 25 of a known-wavelength into the region(s) in which objects 20 and 22 reside. However, it is to be understood that use of acoustic source 24 is not a requirement or limitation of the present invention.

The present invention will first be described for estimating the size of object 20 lying in the end fire region of array 30. The N signals detected by N-channel array 30 are indicative of acoustic radiation (reflections) 21. The continuously received signals are sampled at a time based on the relative location of each acoustic receiver in array 30 and the speed of propagation of acoustic radiation (reflections) 21. For the end fire situation, acoustic receiver 32-1 is sampled at a time t and each successive receiver is sampled at a time delayed from t where the time delay is a function the distance d from acoustic receiver 32-1 and the speed of propagation of acoustic radiation (reflections) 21.

Based on the concepts for an aperture in an infinite screen described above, the speed of propagation of radiation (reflections) 21 will be a distribution of speeds if the size of object 20 is on the order of the wavelength of acoustic radiation (reflections) 21. More specifically, if object 20 has a diameter D that is less than approximately twice the wavelength of acoustic radiation (reflections) 21, there will be a distribution of propagation speeds that is indicative of the size of object 20. In its simplest form, the present invention assumes or approximates a circular shape for object 20. However, it is to be understood that the invention can be used to approximate other shapes for object 20 at the expense of more complicated processing.

Assuming the size of object 20 is on the order of the wavelength of acoustic radiation (reflections) 21, the present invention determines the distribution of the speed of propagation associated therewith. To do this, M different speeds of propagation are estimated and used in the processing of the sampled signals from array 30. The M different speeds define a range of distribution of speeds that acoustic radiation (reflections) 21 are expected to exhibit for the size of an object (e.g., object 20) of interest.

In FIG. 3, there is shown a flowchart providing the method 34 of using this invention. This flowchart is made for the embodiment in which an acoustic signal (25 in FIG. 2) is transmitted toward an object (20 or 22 in FIG. 2) in step 36 and reflects (21 or 23 in FIG. 2) from the object. Step 36 can be omitted when the object is radiating an acoustic signal at a known wavelength. The acoustic signal is received 38 at an array of sensors 30. The received signal at each sensor is processed 40 in parallel. In one embodiment, the step of processing 40 can be merely forming an amplitude sum of the signals received at each sensor. This is further detailed in the discussion of FIG. 4A below. In another embodiment, the step of processing 40 can be forming an amplitude sum of the, signals and then performing a temporal Fourier transform of the signals. This is further detailed in the discussion of FIG. 4B below. In either case, processing 40 accounts for the orientation of the array 30 and the spacing of sensors 32-1 through 32-N while calculating the amplitude sum. In step 44, the invention determines if velocity spreading exists in the amplitude sums. If velocity spreading does not exist, the object must be larger than two wavelengths ($2\lambda$), and a different method must be used to determine size. If velocity spreading does exist, a database of known object data 48 can be compared in step 50 with the amplitude sums and the Fourier transforms to give information about the object. In the most basic case, the known object database 48 contains data from disks having a range of diameters below the two wavelengths limit. In a more complicated case, the know object database 48 contains objects having a variety of different shapes, sizes and orientations. These objects can be disks, spheres or cylinders. The comparison step 50 provides an output of the diameter of the object, the object's shape, and/or the object's orientation. Output is provided in step 52 to a user or to another system.

Figure 4A:
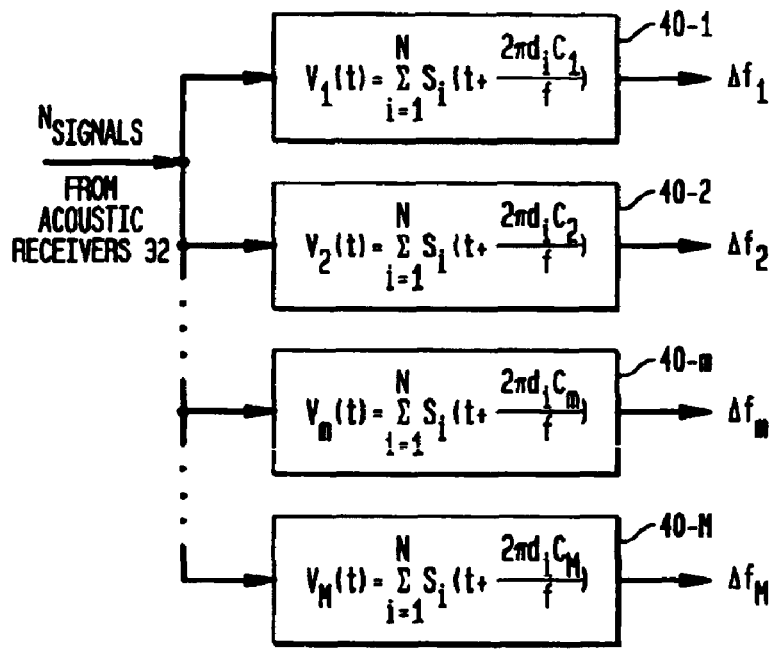
FIG. 4A is a schematic view of a first embodiment of a system for processing the acoustic radiation received by the receivers in FIG. 2 in accordance with the present invention.
Figure 4B:
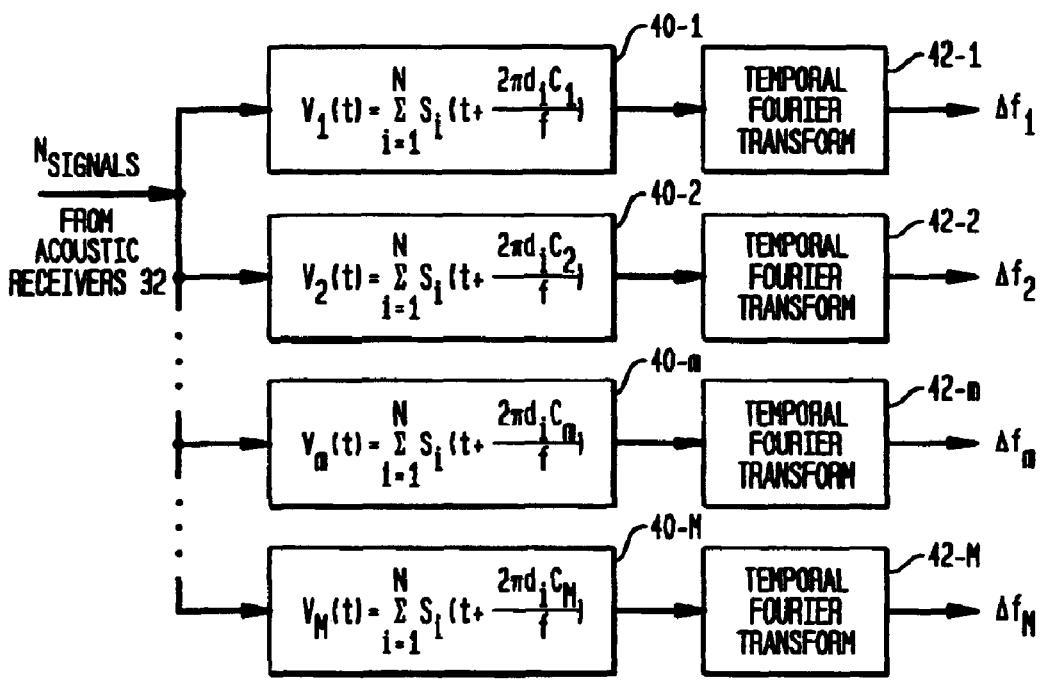
FIG. 4B is a schematic of a second embodiment of a system for processing the acoustic radiation received by the receivers in FIG. 2 in accordance with the present invention.

Processing of the N sampled signals $s_i$ for i=1 to N is carried out as illustrated in FIGS. 4A and 4B where parallel processing (e.g., by individual processors or one parallel processor) improves processing efficiency; however, sequential processing can be used. Each of M processors 40-1, ..., 40-M forms a sum V(t) of the time sampled signals $s_i$ where the first term in each summation is the signal sampled at acoustic receiver 32-1 at time t and each successive i-th term is delayed by $(2\pi d_i/c_m)$ where $d_i$ is the distance from the i-th receiver to receiver 32-1, cm is an estimated speed of propagation for the m-th processor, and f is the frequency of acoustic radiation (reflections) 21. Each of the resulting M time series summations (e.g., voltage signals $V_m(t)$) for m=1 to M can have (as illustrated by the FIG. 4B embodiment) a temporal Fourier transform applied thereto at 42-1, ..., 42-M as a measure of the Doppler shift $\Delta f$. Lower speeds of propagation lead to increased Doppler shifts. The Doppler shift measurements are an independent check on each propagation velocity.

An amplitude distribution as a function of speed of propagation $c_m$ for m=1 to M indicates the presence of a "small" target. Conversely, little or no velocity spread is indicative of the fact that no "small" targets are present in the region of interest. Assuming there is a velocity distribution, the actual amplitude (voltage) distribution as a function of $c_m$ is used to estimate the size of object 20 as follows. The measured distribution is compared to a plurality of two-dimensional spatial Fourier transform distributions determined for a corresponding plurality of known-dimension, circular apertures in infinite acoustically-opaque screens. The aperture size of the spatial Fourier transform distribution that most closely matches the measured/determined amplitude distribution (vs. $c_m$ approximates a (circular shape) size of object 20.

For object 22 that resides away from the end fire of array 30, processing in each beam of array 30 would proceed the same as described above so that the amplitude would again be estimated for each of the M estimated speeds of propagation $c_m$. Away from end fire, the effect of a distribution of propagation speeds is exhibited as a "beam spreading," effect where slower acoustic velocities lead to signals in adjacent beams. Beam spreading also occurs due to multipaths, which would show up in adjacent beams closer to broadside. In active sonar (e.g., where acoustic source 24 provides acoustic radiation that generates reflections 21), the main path could be identified as the one arriving first. As is known in the art, this can be accomplished with replica correlator processing. Multipaths would appear in adjacent beams closer to broadside while any velocity distribution would lead to adjacent beams further away from broadside and involving velocities slower than the speed of propagation in the main path. The resulting Doppler shifts would be increased in adjacent beams due to the slower acoustic velocity in the beam. Since this would not occur as a result of multipaths, it provides a method to distinguish between beam spreading due to a velocity distribution with that due to multipaths.

The advantages of the present invention are numerous. Small underwater targets can have their size estimated. Such size estimation is an important clue used in target classification.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for estimating the size of an object in a fluid medium comprising the steps of:

detecting acoustic radiation having a known wavelength using a line array of N acoustic receivers wherein N signals indicative of said detected radiation are generated;

forming M time series summations using said N signals wherein each of said M time series summations is formed using a time delay predicated on a corresponding estimated speed of propagation of said acoustic radiation;

providing time series summations from known objects;

comparing said M time series summations with said time series summations from known objects; and providing an output indicating which known object is most similar to said M time series summations.

2. The method of claim 1 further comprising the steps of:

performing a temporal Fourier transform on each of said M time series summations to generate M values wherein the Doppler shifts of said M values vary as a function of the estimated speed of propagation and are indicative of said estimated speed of propagation;

providing temporal Fourier transforms from known objects;

comparing said M values with said temporal Fourier transforms from said known objects; and wherein said step of providing an output indicating which known object is most similar to said M time series summations also utilizes said M values.

3. The method of claim 1 wherein said known objects are disks having preset diameters.

4. The method of claim 1 wherein said known objects are three dimensional solids having different sizes and selected from the set including disks, cylinders and spheres.

5. The method of claim 1 further comprising the steps of:

determining whether spreading exists from said M time series summations; and indicating that said acoustic radiation comes from a large source it the step of determining indicates the absence of spreading.

6. The method of claim 1 further comprising transmitting acoustic radiation at a known wavelength for reflection off an object prior to said step of receiving, wherein said step of receiving receives the reflection.

7. A method according to claim 1 wherein, for each of said M time series summations, said step of forming comprises the steps of:

sampling each of said N signals at a unique point in time defined by said time delay and a position of each of said N acoustic receivers, wherein N sampled signal values $s_i$ for i=1 to N are generated; and adding said N sampled signal values $s_i$ for i=1 to N.

8. A method for estimating the size of an object having a diameter D, comprising the steps of:

transmitting acoustic radiation having a known wavelength λ into a region of a fluid medium;

detecting reflections of said acoustic radiation using a line array of N acoustic receivers positioned in said fluid medium wherein N signals indicative of said reflections are continuously generated;

sampling each of said N signals at a unique point in time based on relative positions of each of said N acoustic receivers and an estimated speed of propagation of said reflections, wherein N sampled signal values $s_i$ for i=1 to N are generated;

adding said N sampled signal values $s_i$ for i=1 to N;

repeating said steps of sampling and adding for M unique estimated speeds of propagation of said reflections, wherein M sums are formed and wherein said M sums vary as a function of said M unique estimated speeds of propagation and are indicative of said diameter D.

9. A method according to claim 8 wherein said M sums as a function of said M unique estimated speeds of propagation define a distribution when said diameter D is on the order of λ, said method further comprising the step of:

comparing said distribution with a plurality of known two-dimensional spatial Fourier transform distributions generated from impingement of an acoustic wave on a first side of an acoustically opaque screen having a circular aperture formed therethrough;

wherein each of said plurality of known two-dimensional spatial Fourier transform distributions is developed for a known diameter of said circular aperture associated therewith; and wherein said diameter D of said object is approximately equal to said known diameter of said circular aperture for one of said plurality of known two-dimensional spatial Fourier transform distributions that most closely matches said distribution.

10. A method for estimating the size of an object, comprising the steps of:

monitoring acoustic radiation originating from a region of a fluid medium using a line array of N acoustic receivers wherein N signals indicative of said acoustic radiation so-monitored are generated, said acoustic radiation having a known wavelength λ;

sampling each of said N signals at a unique point in time based on relative positions of each of said N acoustic receivers and an estimated speed of propagation of said acoustic radiation, wherein N sampled signal values $s_i$ for i=1 to N are generated;

adding said N sampled signal values $s_i$ for i=1 to N;

repeating said steps of sampling and adding for M unique estimated speeds of propagation of said acoustic radiation, wherein M sums are formed; and performing a temporal Fourier transform on each of said M sums to generate M values wherein, for an object in said region having a diameter D on the order of λ, said M values vary as a function of said M unique estimated speeds of propagation and are indicative of said diameter D.

11. A method according to claim 10 wherein said M values as a function of said M unique estimated speeds of propagation define a distribution when said diameter D on the order of λ, said method further comprising the step of:

comparing said distribution with a plurality of known two-dimensional spatial Fourier transform distributions generated from impingement of an acoustic wave on a first side of an acoustically opaque screen having a circular aperture formed therethrough;

wherein each of said plurality of known two-dimensional spatial Fourier transform distributions is developed for a known diameter of said circular aperture associated therewith; and wherein said diameter D of said object is approximately equal to said known diameter of said circular aperture for one of said plurality of known two-dimensional spatial Fourier transform distributions that most closely matches said distribution.

* * * * *